United States Patent
Choi

(10) Patent No.: US 7,847,879 B2
(45) Date of Patent: Dec. 7, 2010

(54) LIQUID CRYSTAL DISPLAY MODULE HAVING A TOP FRAME WITH CURVED CORNERS AND AT LEAST ONE SIDE SURFACE THAT IS FOLDED BACK AND AGAINST ITSELF TO PROVIDE A DOUBLE-LAYERED THICKNESS

(75) Inventor: Hee-Ryoul Choi, Busan (KR)

(73) Assignee: LG Display Co., Ltd., Seoul (KR)

( * ) Notice: Subject to any disclaimer, the term of this patent is extended or adjusted under 35 U.S.C. 154(b) by 182 days.

(21) Appl. No.: 12/285,369

(22) Filed: Oct. 2, 2008

(65) Prior Publication Data

US 2009/0103001 A1 Apr. 23, 2009

(30) Foreign Application Priority Data

Oct. 2, 2007 (KR) .................... 10-2007-0099433

(51) Int. Cl.
*G02F 1/1333* (2006.01)
(52) U.S. Cl. ........................................ 349/58; 362/633
(58) Field of Classification Search ............. 349/58–60; 362/632–634
See application file for complete search history.

(56) References Cited

U.S. PATENT DOCUMENTS

2005/0094054 A1* 5/2005 You et al. ...................... 349/58
2005/0151895 A1* 7/2005 Fukuyoshi et al. ............ 349/58

* cited by examiner

*Primary Examiner*—John Heyman
(74) *Attorney, Agent, or Firm*—Mckenna Long & Aldridge

(57) ABSTRACT

A liquid crystal display module includes a bottom frame having a bottom surface and first to fourth side surfaces; a backlight unit disposed on the bottom surface of the bottom frame; a liquid crystal panel over the backlight unit; a main frame surrounding a side of the backlight unit and a side of the liquid crystal panel; and a top frame surrounding an edge of the liquid crystal panel and having a top surface and first to fourth side surfaces, wherein each of corners of the first to fourth side surfaces of the top frame has a curved shape, and wherein the first side surface of the top frame has a double-layered structure and the top surface has a single-layered structure such that the first side surface has a thickness twice that of the top surface.

9 Claims, 6 Drawing Sheets ns of the main frame 27. The reflective sheet
LIQUID CRYSTAL DISPLAY MODULE HAVING A TOP FRAME WITH CURVED CORNERS AND AT LEAST ONE SIDE SURFACE THAT IS FOLDED BACK AND AGAINST ITSELF TO PROVIDE A DOUBLE-LAYERED THICKNESS The present invention claims the benefit of Korean Patent Application No. 10-2007-0099433 filed in Korea on Oct. 2, 2007, which is hereby incorporated by reference for all purpose as if fully set forth herein.

BACKGROUND OF THE INVENTION

1. Field of the Invention

Embodiments of the invention relate to a liquid crystal display module (LCDM), and more particularly, to an LCDM that includes a top cover and a bottom cover to have an improved mechanical strength.

2. Discussion of the Related Art

As the society has entered in earnest upon an information age, a field of display devices that represent all sorts of electrical signals as visual images has developed rapidly and many kinds of flat panel display devices (FPDs), such as liquid crystal display (LCD) devices, plasma display panels (PDPs), field emission display (FED) devices, electroluminescence display (ELD) devices, and so on, have been introduced. Since they have excellent capabilities of a thin profile, light weight and low power consumption, and so on, they are substituted for the cathode ray tube (CRT) rapidly and came into the spotlight.

Among these devices, LCD devices are widely used for notebook computers, monitors, TV, and so on, because of their high contrast ratio and characteristics adequate to display moving images. Generally, an additional light source is required because the LCD panel is a non-emissive-type display device. Accordingly, a backlight unit is disposed under the LCD panel. The LCD device displays images using light produced by the backlight unit and supplied to the LCD panel. The backlight units includes one of a cold cathode fluorescent lamp (CCFL), an external electrode fluorescent lamp (EEFL) and a light emitting diode (LED) as a light source.

FIG. 1 is an exploded perspective view of the related art LCDM. Referring to FIG. 1, the LCDM includes a liquid crystal panel 11, a backlight unit 20, a main frame 27, a bottom frame 40 and a top frame 30. The liquid crystal panel 11 includes first and second substrates (not shown) facing each other and a liquid crystal layer therebetween. The liquid crystal panel 11 is connected to gate and data printed circuit boards (PCBs) 17 through a flexible circuit board 15 that provide a scanning signal and an image signal to the liquid crystal panel 11, respectively. The printed circuit board 17 extends along end portions of the bottom frame 40, respectively, as dummy spaces. The backlight unit 20 is disposed at a backside of the liquid crystal panel 11. The liquid crystal display panel 11 and the backlight unit 20 are combined using the main frame 27 that can prevent movement of the liquid crystal panel 11 and the backlight unit 20. The top frame 30 cover edges of the liquid crystal panel 11 and sides of the main frame 27, so the top frame 30 can support and protect of the edges of the liquid crystal panel 11 and sides of the main frame 27. The bottom frame 40 covers back edges of the main frame 27, so the bottom frame 40 is combined with the main frame 27 and the top frame 30 for modulation.

The backlight unit 20 includes a lamp 29, a reflective sheet 25, a light guide plate 23 and a plurality of optical sheets 21. The lamp 29 is disposed at a side of the main frame 27 along a length direction of the main frame 27. The reflective sheet 25 is disposed on the bottom cover 40 and has one of white and silver colors. The light guide plate 23 is disposed on the reflective sheet 25, and the plurality of optical sheets 21 is disposed on the light guide plate 23.

With the above mentioned structure, light emitted from the lamp 29 is incident into the light guide plate 23 and is refracted by the light guide plate 23 into the liquid crystal panel 11. By the light passing through the plurality of optical sheets 21, it has a uniform brightness. The liquid crystal panel 11 displays images using the light. It is required for the LCDM to have an improved mechanical strength.

FIG. 2 is an enlarged perspective view of an "A" portion of a top frame in FIG. 1, and FIG. 3 is an enlarged perspective view of a "B" portion of a bottom frame in FIG. 1. Referring to FIG. 2, the top frame 30 has a top surface 31 and side surfaces 33. The top surface 31 covers edges of the liquid crystal panel 11 (of FIG. 1) and has an opening 31a corresponding to the liquid crystal panel 11 (of FIG. 1). The side surfaces 33 extend from the top surface 31, and a corner of each side surface 33 has a dented portion 36 of a rectangular shape. Two adjacent side surfaces 33 are discontinuous due to the dented portion 36. Namely, each corner includes an opening.

Referring to FIG. 3, the bottom frame 40 has a bottom surface 41 and side surfaces 43. The bottom surface 41 covers the backlight unit 20 (of FIG. 1). The side surfaces 43 extend from the top surface 41, and corner of each side surface 43 has a dented portion 46 of a rectangular shape. Two adjacent side surfaces 43 are discontinuous due to the dented portion 46.

On the other hand, based on requirements of light weight and a thin profile, there are requirements on the top frame 30 and the bottom frame 40 to be thinner. As the top frame 30 and the bottom frame 40 become thinner, a mechanical strength in the corners of the top frame 30 and the bottom frame 40 is degraded due to the discontinuous portions. As a result, the top and bottom frames 30 and 40 may be twisted. The LCDM may be twisted depending on the twisted top and bottom frame 30 and 40. To be resolved these problems, new material having an improved mechanical strength is used for the top and bottom frames 30 and 40 or additional elements are formed. However, it causes problems in a fabricating process to be complicated and a production costs to increase.

SUMMARY OF THE INVENTION

Accordingly, embodiments of the invention are directed to an LCDM that substantially obviate one or more of the problems due to limitations and disadvantages of the related art.

An advantage of the invention is to prevent an LCDM being twisted.

Another advantage of the invention is to simplify a fabricating process and reduce production costs for an LCDM.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the invention, as embodied and broadly described, a liquid crystal display module includes a bottom frame having a bottom surface and first to fourth side surfaces; a backlight unit disposed on the bottom surface of the bottom frame; a liquid crystal panel over the backlight unit; a main frame surrounding a side of the backlight unit and a side of the liquid crystal panel; and a top frame surrounding an edge of the liquid crystal panel and having a top surface and first to fourth side surfaces, wherein each of corners of the first to fourth side surfaces of the top frame has a curved shape, and wherein the first side surface of the top frame has a double-layered structure and the top surface has a single-layered structure such that the first side surface has a thickness twice that of the top surface.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principle of the invention. In the drawings.

DETAILED DESCRIPTION OF EXEMPLARY EMBODIMENTS

Reference will now be made in detail to exemplary embodiments of the invention, which are illustrated in the accompanying drawings.

Figure 1:
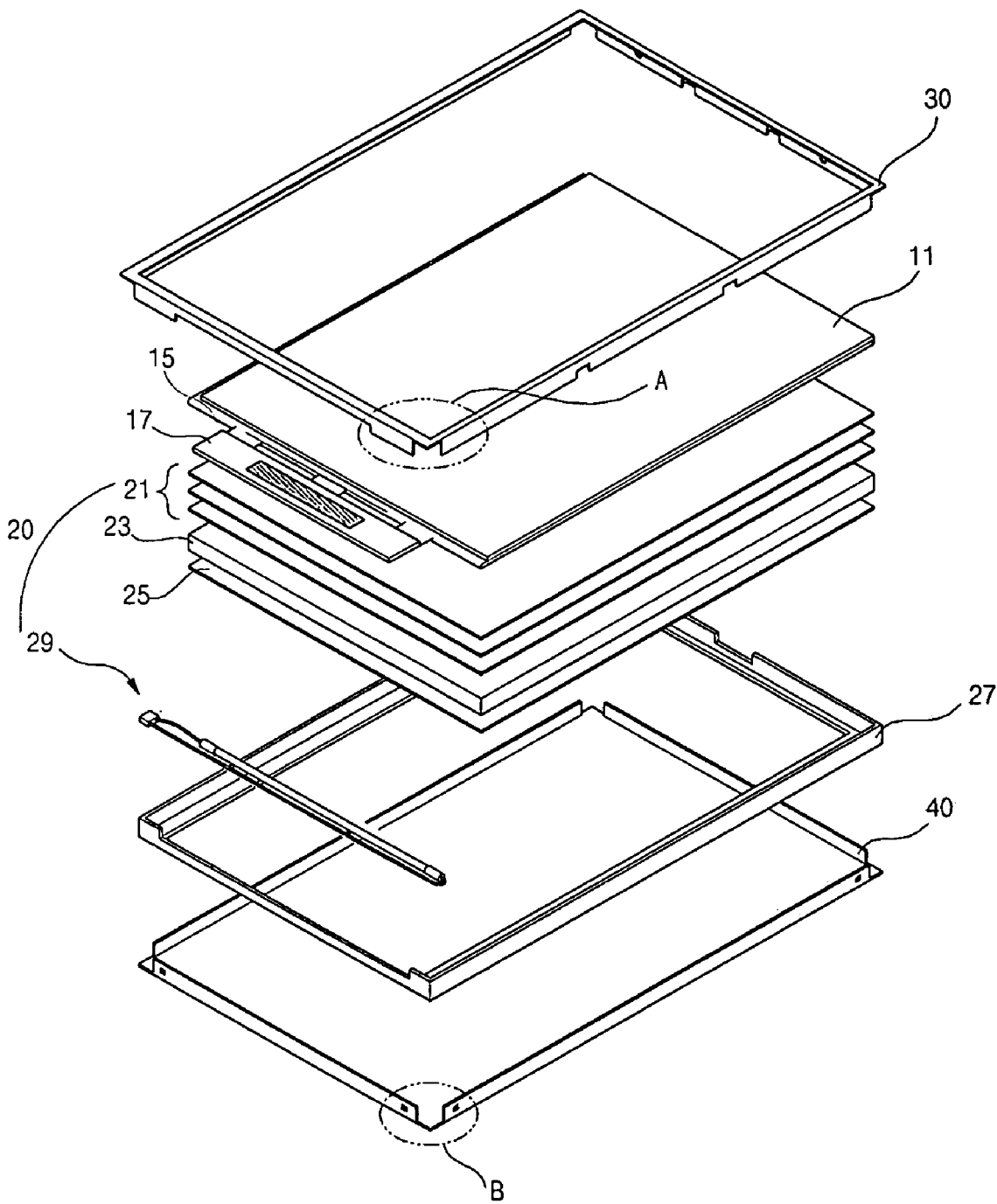
FIG. 1 is an exploded perspective view of the related art LCDM.
Figure 2:
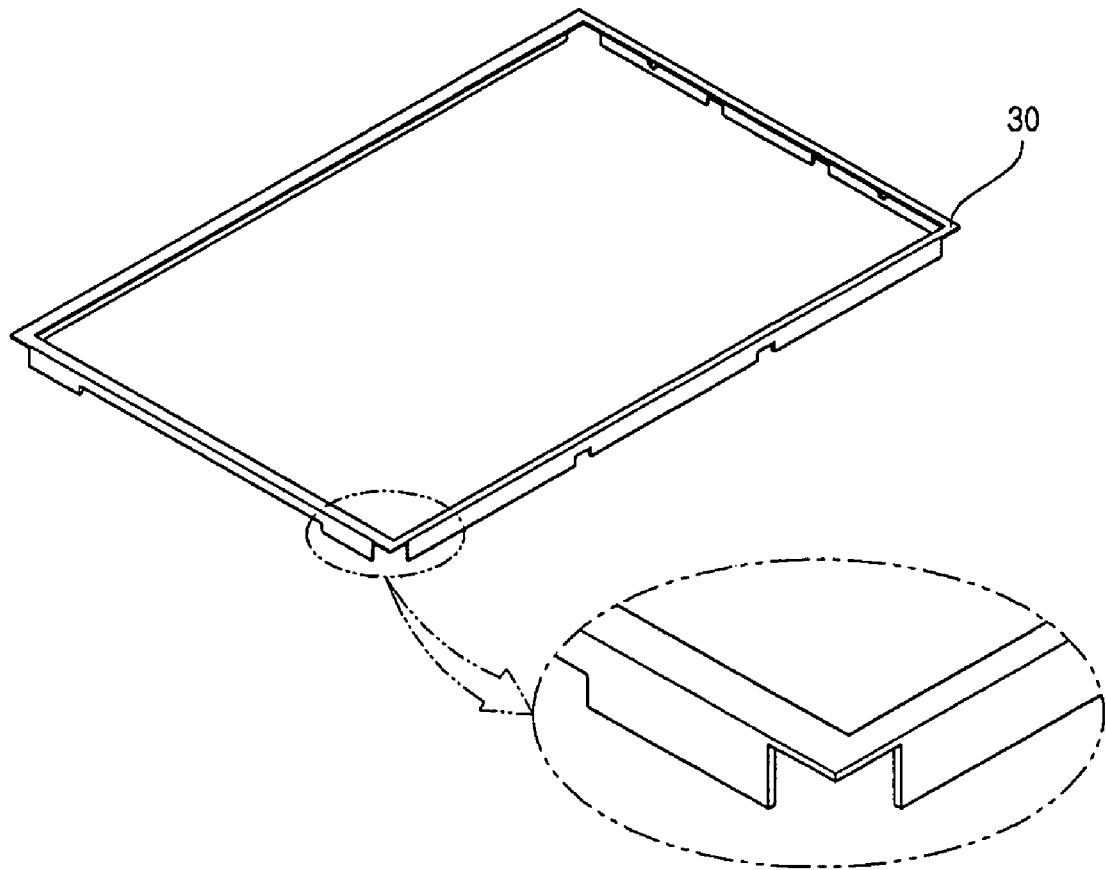
FIG. 2 is an enlarged perspective view of an "A" portion of a top frame in FIG. 1.
Figure 3:
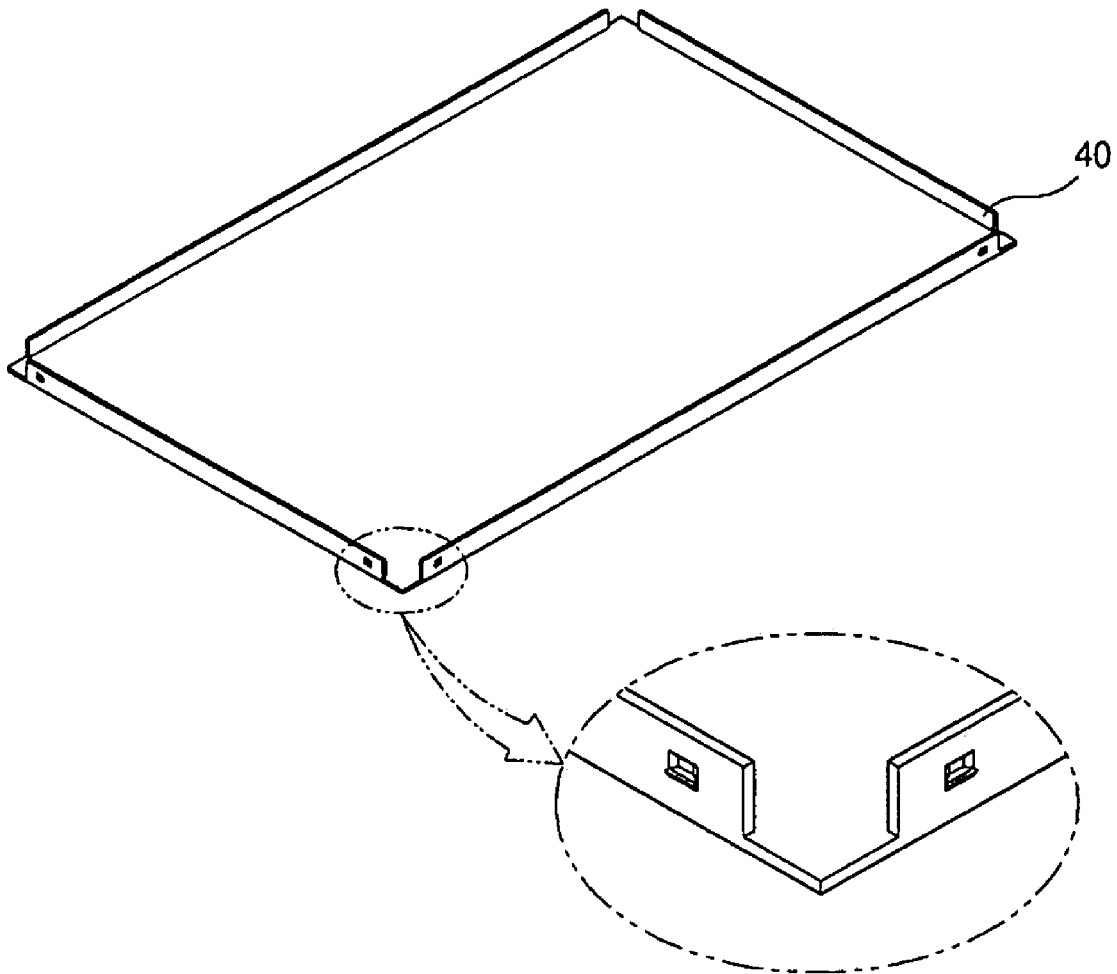
FIG. 3 is an enlarged perspective view of a "B" portion of a bottom frame in FIG. 1.
Figure 4:
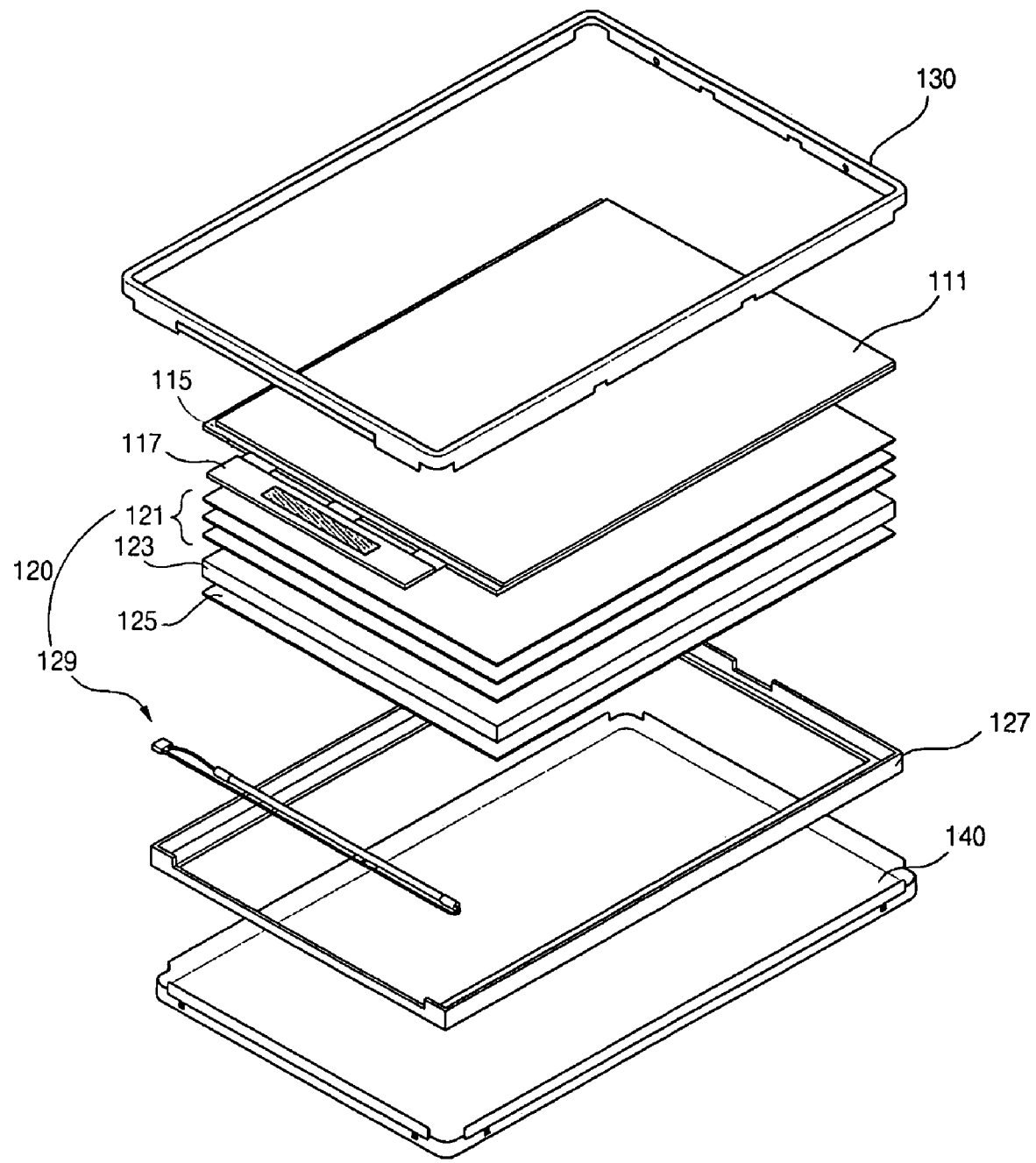
FIG. 4 is an exploded perspective view of an LCDM according to the present invention.

FIG. 4 is an exploded perspective view of a liquid crystal display module (LCDM) according to the present invention. Referring to FIG. 4, the LCDM includes a liquid crystal panel 111, a backlight unit 120, a main frame 127, a bottom frame 140 and a top frame 130.

Although not shown, the liquid crystal panel 111 includes first and second substrates facing each other and a liquid crystal layer therebetween. When the liquid crystal panel 111 is driven in an active matrix type, a gate line and a data line, which cross each other to define a pixel region, are formed on the first substrate. The first substrate may be referred to as an array substrate. A thin film transistor (TFT) is disposed at a crossing portion of the gate and data lines. A pixel electrode in each pixel region is connected to the TFT.

A black matrix having a lattice shape is formed on the second substrate. The black matrix corresponds to a non-display region, such as the gate line, the data line and the TFT. A color filter layer, which includes red, green and blue sub-color filters and corresponds to each pixel region, is formed on the second substrate. Moreover, a common electrode is formed on the black matrix and the color filter layer. The second substrate may be referred to as a color filter substrate.

The liquid crystal panel 111 is connected to gate and data printed circuit boards (PCBs) 117 through a flexible circuit board 115 that provide a scanning signal and an image signal to the liquid crystal panel 111, respectively. The printed circuit board 117 extends along end portions of the bottom frame 140, respectively, as dummy spaces. In FIG. 4, the printed circuit board 117 is disposed at one side of the liquid crystal panel 111. However, there are two printed circuit boards 117 at two adjacent sides of the liquid crystal panel 111. One includes a gate driving circuit applying a scanning signal, which controls ON/OFF in the TFT, to the gate line, and the other includes a data driving circuit applying an image signal to the data line.

When the TFT has an ON state by the scanning signal, the image signal is applied to the pixel electrode through the data line to produce an electric field between the pixel electrode and the common electrode. As a result, as the intensity or direction of the electric field is changed, the alignment of the liquid crystal molecules also changes such that light transmissivity is controlled.

The backlight unit 120 as a light source is disposed at a backside of the liquid crystal panel 111. The liquid crystal display panel 111 and the backlight unit 120 are combined using the main frame 127 that can prevent movement of the liquid crystal panel 111 and the backlight unit 120. The top frame 130 cover edges of the liquid crystal panel 111 and sides of the main frame 127, so the top frame 130 can support and protect of the edges of the liquid crystal panel 111 and sides of the main frame 127. The bottom frame 140 covers back edges of the main frame 127, so the bottom frame 140 is combined with the main frame 127 and the top frame 130 for modulation.

The backlight unit 120 includes a lamp 129, a reflective sheet 125, a light guide plate 123 and a plurality of optical sheets 121. The lamp 129 is disposed at a side of the main frame 127 along a length direction of the main frame 127. The reflective sheet 125 is disposed on the bottom cover 140 and has one of white and silver colors. The light guide plate 123 is disposed on the reflective sheet 125, and the plurality of optical sheets 121 is disposed on the light guide plate 123. The lamp 129 is positioned at a side of the light guide plate 123. Although not shown, the backlight unit 120 includes a lamp guide. The lamp guide has an opening toward the light guide plate 123. The lamp guide surrounds the lamp 129 to protect the lamp 129. Light emitted from the lamp 129 is guided by the light guide plate 123 to be incident into the liquid crystal panel 111. The light has a uniform brightness with passing through the plurality of optical sheets 121.

On the other hand, in FIG. 4, the lamp 129 is disposed at a side of the main frame 127. This may be referred to as an edge type backlight unit. However, the lamp may be disposed on a center portion of the bottom frame 140. In this case, a reflective layer may be disposed between the bottom frame 140 and the lamp. This may be referred to as a direct type backlight unit.

The top frame 130 and the bottom frame 140 have an improved mechanical strength (crashworthy property). To increase the mechanical strength, a drawing process is performed on corners of side surfaces of each of the top and bottom frames 130 and 140, and a hemming process is performed on the side surfaces of each of the top and bottom frames 130 and 140. Namely, the corners of the side surfaces of each of the top and bottom frames 130 and 140 has a curved shape without discontinuations, and the side surfaces of each of the top and bottom frames 130 and 140 has a double-layered structure.

Figure 5:
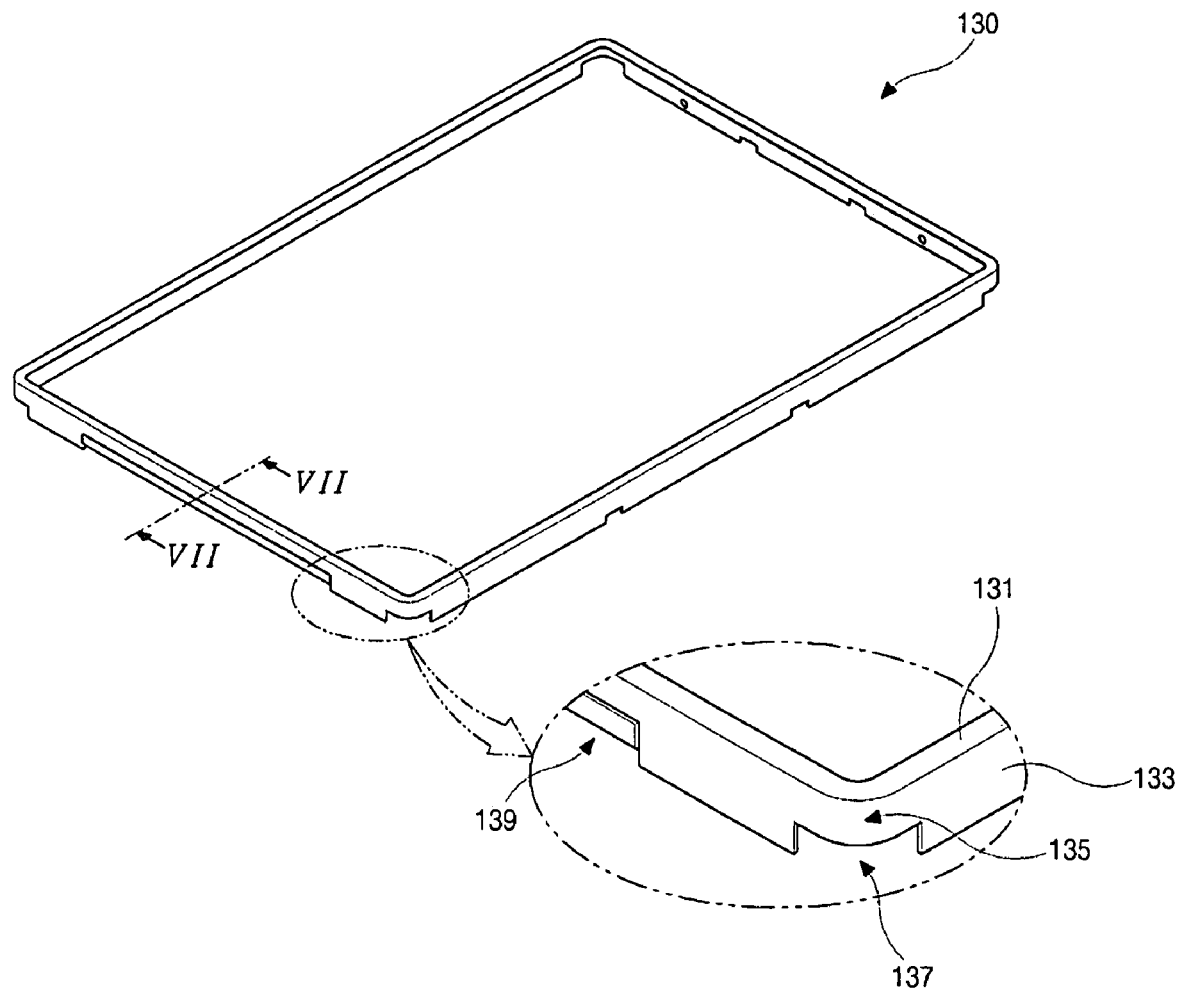
FIG. 5 is a perspective view of a top frame of an LCDM according to the present invention.

FIG. 5 is a perspective view of a top frame of an LCDM according to the present invention. Referring to FIG. 5, the top frame 130 is combined with the main frame 127 (of FIG. 4) and the bottom frame 140 (of FIG. 4) to protect an upper portion of the LCDM. The top frame 130 has a top surface 131 and side surfaces 133. The top surface 131 covers edges of a top surface of the liquid crystal panel 111 (of FIG. 4) and has an opening to expose the top surface of the liquid crystal panel 111 (of FIG. 4). The side surfaces 133 extend from the top surface 131 of the top frame 130 to cover side surface of the liquid crystal panel 111 (of FIG. 4). The side surfaces 133 of the top frame 130 are continuous as a whole. A corner 135 of the side surface 133 has a curved shape by a drawing process. The curve-shaped corner 135 makes the top frame 130 have an improved mechanical strength. Namely, since each side surface 133 is combined by the curve-shaped corner 135, the top frame 130 has an improved mechanical strength with compared to the related art top frame having an opening at corner of the side surfaces. As a result, a twisted problem in the top frame is prevented.

When adjacent side surfaces are combined perpendicularly without the curve-shaped corner, stress is concentrated into the perpendicular corner of the side surface. Accordingly, even if the side surfaces are continuous, the top frame becomes to be twisted. In the present invention, since the side surfaces 133 are combined with the corner 135 having a curved-shape, stress is uniformly distributed. Accordingly, the top frame 130 has an improved mechanical strength such that there is no problem of being twisted.

On the other hand, a chamfer portion 137 is disposed at the corner 135. A portion of the corner 135 is removed. The removed portion serves as the chamfer portion 137. The reason why the chamfer portion 137 is formed at the corner 135 of the side surface 133 of the top frame 130 is that a metallic material, for example, aluminum or steel, for the top cover 130 has a malleability property. In this case, by removing a portion of the corner 135 of the side surface 133 of the top frame 130, the top cover 130 can be easily fabricated.

A fabricating process for the top cover 130 is explained. First, a metal plate is cut to obtain a tetragonal metal plate. A tetragonal opening is formed in the tetragonal metal plate. Then, edges of the tetragonal metal plate are processed by a bending process and corners of the tetragonal metal plate are processed by a drawing process such that the top cover 130 in FIG. 5 can be obtained. In this case, without the chamfer 137 at the corner 135, there may be a wrinkle problem and/or a crack problem. The chamfer 137 has a minimum height considering a mechanical strength of the top cover 130.

A PCB exit portion 139 is disposed at one side surface 133 of the top frame 130. When the top frame 130 is combined with the liquid crystal panel 111, the PCB 117 protrudes from the top frame 130 through the PCB exit portion 139. The protruded PCB 117 extends along a side portion or rear portion of the bottom frame 140. Since the PCB exit portion 139 is formed at the one side surface 133 of the top frame 130, a mechanical strength of the one side surface 133, where the PCB exit portion 139 is formed, is very weak with compared to other side surfaces 133. Accordingly, the one side surface 133, where the PCB exit portion 139 is formed, is processed by a hemming process to have a double-layered structure, while the top surface 131 has a single-layered structure. Namely, end portion of the one side surface 133 is bent to be stacked on other portion of the one side surface 133. The end portion of the one side surface 133 is outwardly bent such that the end portion of the one side surface 133 contacts the other portion of the one side surface 133. When the end portion of the one side surface 133 is outwardly bent, there is a sufficient inner space by the top surface 131 and four side surfaces 133. By the hemming process, the one side surface 133 has improved mechanical strength and exterior look.

Figure 6:
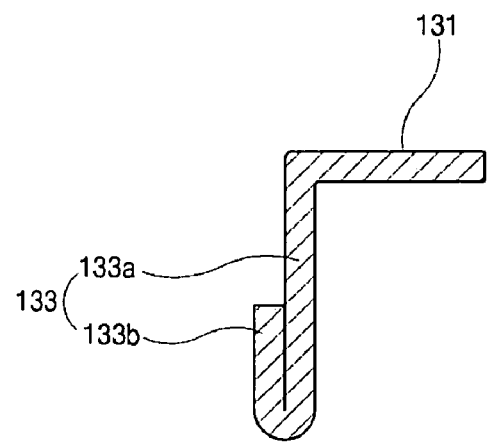
FIG. 6 is a cross-sectional view of a portion taken along the line VII-VII' in FIG. 5.

FIG. 6 is a cross-sectional view of a portion taken along the line VII-VII' in FIG. 5. In FIG. 6, a portion of the one side surface 133, where the PCB exit portion 139 (of FIG. 5) is formed, of the top frame 130 is completely folded. The portion of the one side surface 133 is outwardly bent. In more detail, the side surface 133 perpendicularly protrudes from the top surface 131 of the top frame 130. The one side surface 133, where the PCB exit portion 139 (of FIG. 5) is formed, of the top frame 130 includes a first side surface 133a and a second side surface 133b. The first side surface 133a perpendicularly extends from the top surface 131, and the second side surface 133b is completely folded on the first side surface 133b by the hemming process. The second side surface 133b is outwardly bent. The first side surface 133a and the second side surface 133b are continuous as a whole. Accordingly, the one side surface 133, where the PCB exit portion 139 (of FIG. 5) is formed, of the top frame 130 has a twice thickness of other side surfaces or the top surface 131 such that a decreased mechanical strength because of the PCB exit portion 139 (of FIG. 5) is compensated. Although not shown, the second side surface may be inwardly bent. In this case, the one side surface 133 also has a twice thickness of other side surfaces or the top surface 131. By a hemming process is performed on other side surfaces, the mechanical strength of the top frame 130 is further improved. Although not shown, when the other side surfaces have a double-layered structure, the portion of the one side surface 133, where the PCB exit portion 139 (of FIG. 5) is formed, may be bent once more such that the one side surface 133 has a triple-layered structure.

As mentioned above, the top cover 130 has an improved mechanical strength by a drawing process on the corners 135 of the side surfaces 133 and a hemming process on at least one side surface 133. The hemming process on the one side surface 133, where the PCB exit portion 139 is formed, is essential. As a result, even if a thickness of the side surface of the top cover depending on a trend of thin and light LCD device, a twisted or bent problem in the top frame is prevented.

Figure 7:
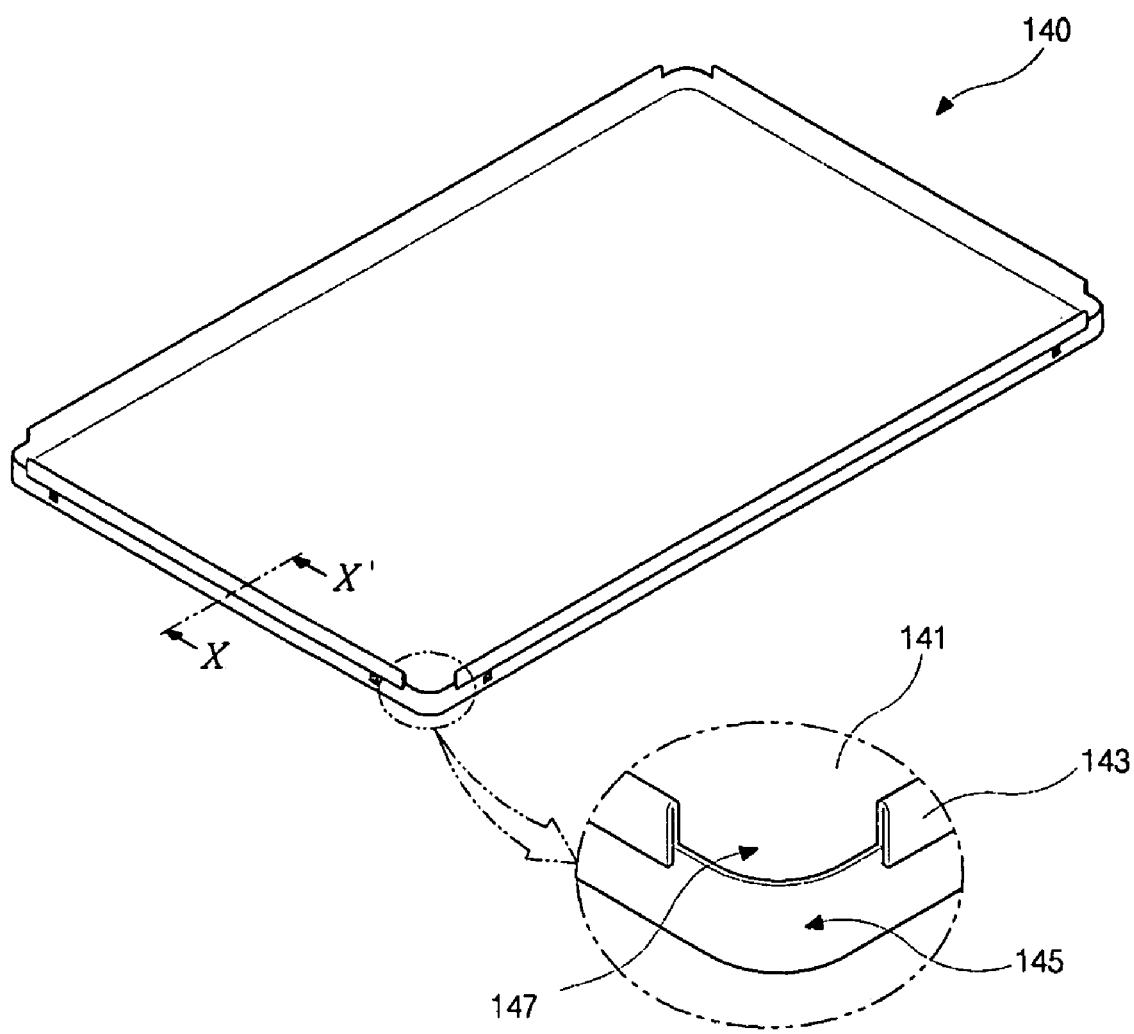
FIG. 7 is a perspective view of a bottom frame of an LCDM according to the present invention.
Figure 8:
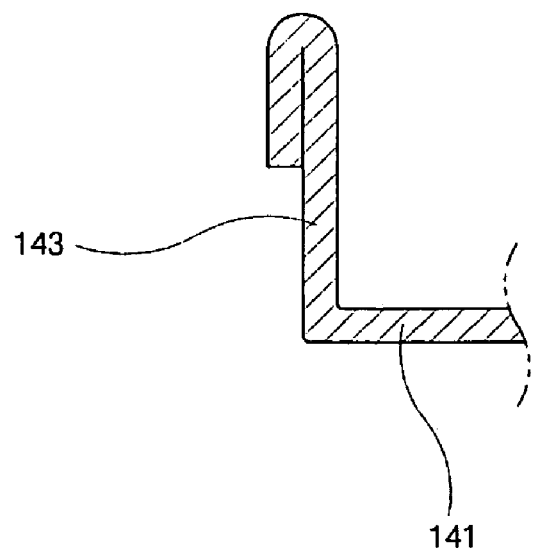
FIG. 8 is a cross-sectional view of a portion taken along the line X-X' in FIG. 7.

FIG. 7 is a perspective view of a bottom frame of an LCDM according to the present invention, and FIG. 8 is a cross-sectional view of a portion taken along the line X-X' in FIG. 7.

In FIG. 7, the bottom frame 140 covers back edges of the main frame 127, so the bottom frame 140 is combined with the main frame 127 and the top frame 130 for modulation. The bottom frame 140 serves as a base plate for the LCD device. The bottom frame 140 includes a bottom surface 141 of a tetragonal plate and four side surfaces 143. Each of the four side surfaces 143 perpendicularly extends from the bottom surface 141 and has a predetermined height. Each Corner 145 of the side surfaces 143 of the bottom frame 140 has a curved shape by a drawing process. In addition, a portion of the curved-shaped corners 145 is removed to form a chamfer 147. As mentioned above, the bottom frame 140 has an improved mechanical strength due to the drawing process.

Namely, since each side surfaces 143 of the bottom frame 140 are combined by the curve-shaped corners 145, the bottom frame 140 has an improved mechanical strength with compared to the related art bottom frame having an opening at corner of the side surfaces. In addition, since the side surfaces 143 are combined with the corners 145 having a curved-shape, stress is uniformly distributed. Accordingly, the top frame 140 has an improved mechanical strength such that there is no problem of being twisted. Moreover, there is no wrinkle problem and/or crack problem in the bottom frame 140 due to the chamfer 147.

In FIG. 8, the side surfaces 143 of the bottom frame 140 are processed by a hemming process to have a double-layered structure, while the bottom surface 141 has a single-layered structure. The side surfaces 143 of the bottom frame 140 has a twice thickness of the bottom surface 141 of the bottom frame. Namely, end portion of the side surface 143 of the bottom frame 140 is bent to be stacked on other portion of the side surface 143 of the bottom frame 140. The end portion of the side surface 143 is outwardly bent such that the end portion of the side surface 143 contacts the other portion of the one side surface 143. When the end portion of the one side surface 143 is outwardly bent, there is a sufficient inner space by the top surface 141 and four side surfaces 143. By the hemming process, the side surface 143 has an improved mechanical strength. As a result, even if a thickness of the side surface of the top cover depending on a trend of thin and light LCD device, a twisted or bent problem in the top frame is prevented.

It will be apparent to those skilled in the art that various modifications and variations can be made in the exemplary embodiments of the LCDM without departing from the spirit or scope of the invention. Thus, it is intended that the invention cover the modifications and variations of this invention provided they come within the scope of the appended claims and their equivalents.

What is claimed is:

1. A liquid crystal display module, comprising:
   a bottom frame having a bottom surface and first to fourth side surfaces;
   a backlight unit disposed on the bottom surface of the bottom frame;
   a liquid crystal panel over the backlight unit;
   a main frame surrounding a side of the backlight unit and a side of the liquid crystal panel; and
   a top frame surrounding an edge of the liquid crystal panel and having a top surface and first to fourth side surfaces,
   wherein each of corners of the first to fourth side surfaces of the top frame has a curved shape, and wherein the first side surface of the top frame is folded back and against itself so as to have a double-layered structure and the top surface has a single-layered structure such that the first side surface has a thickness twice that of the top surface.

2. The liquid crystal display module according to claim 1, wherein an end portion of the first side surface of the top frame is outwardly bent such that the end portion is completely folded on the other portion of the first side surface of the top frame.

3. The liquid crystal display module according to claim 1, wherein a portion of the corners is removed to form a chamfer.

4. The liquid crystal display module according to claim 1, further comprising a printed circuit board connected to one end portion of the liquid crystal panel, wherein a printed circuit board exit portion is formed at the first side surface of the top frame.

5. The liquid crystal display module according to claim 1, wherein the second to third side surfaces of the top frame has a double-layered structure.

6. The liquid crystal display module according to claim 1, wherein each corner of the first to fourth side surfaces of the bottom frame has a curved shape, and wherein each of the first to fourth side surfaces of the bottom frame has a double-layered structure and the bottom surface has a single-layered structure such that each of the first to fourth side surfaces has a twice thickness of the bottom surface.

7. The liquid crystal display module according to claim 6, wherein an end portion of the first to fourth side surfaces of the bottom frame is outwardly bent such that the end portion is completely folded on the other portion of the first to fourth side surfaces of the bottom frame.

8. The liquid crystal display module according to claim 6, wherein a portion of the corners of the first to fourth side surfaces of the bottom frame is removed to form a chamfer.

9. The liquid crystal display module according to claim 1, wherein the backlight unit includes;
   a reflective sheet on the bottom surface of the bottom frame;
   a light guide plate on the reflective sheet;
   a plurality of optical sheets on the light guide plate; and
   a lamp at a side of the light guide plate.

* * * * *